Nov. 11, 1924.　　　　　　　　　　　　　　　　1,515,385
A. P. GROHENS
COFFEE ROASTER
Filed June 8, 1922　　　　　　4 Sheets-Sheet 2
Fig. 2.
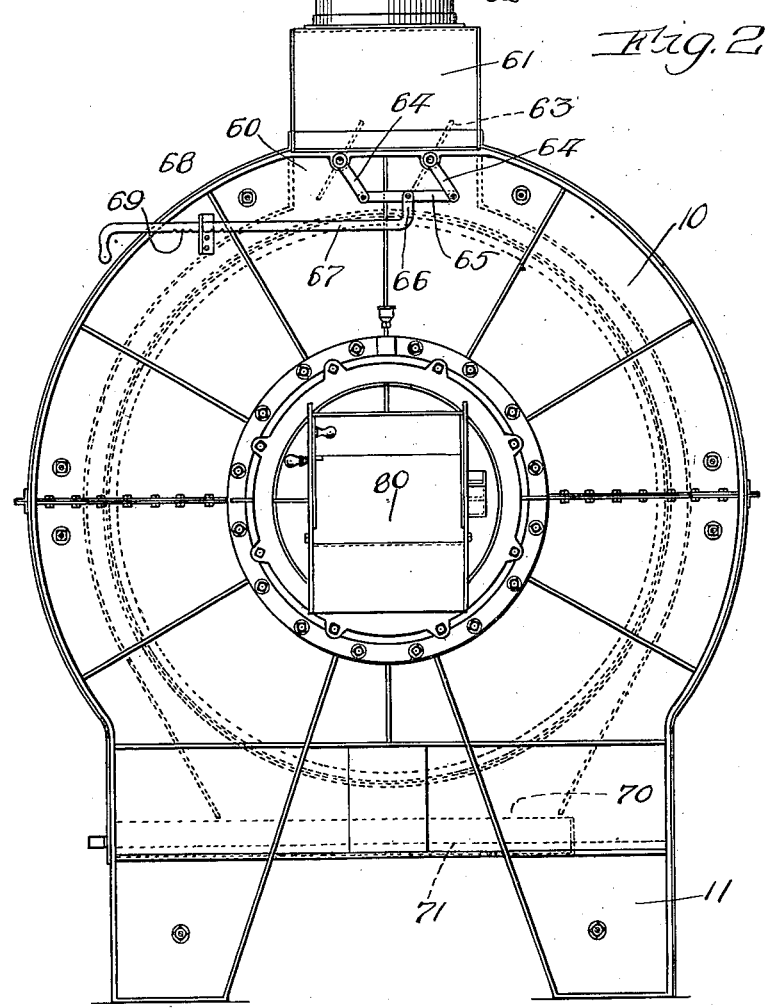
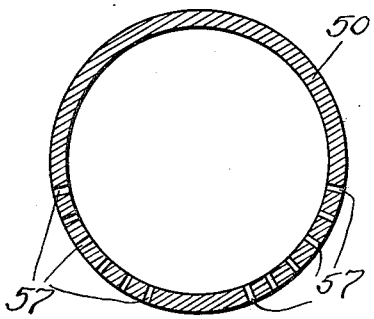
Fig. 6.
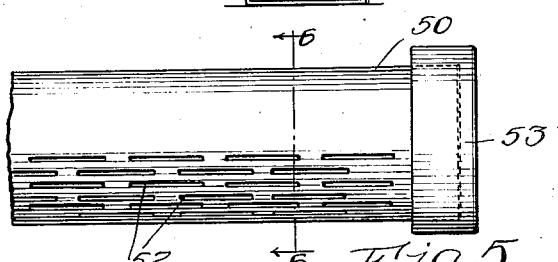
Fig. 5.
Inventor:
Albert P. Grohens,
By Crawford, Lee, Clinton & Wiles,
Attys.

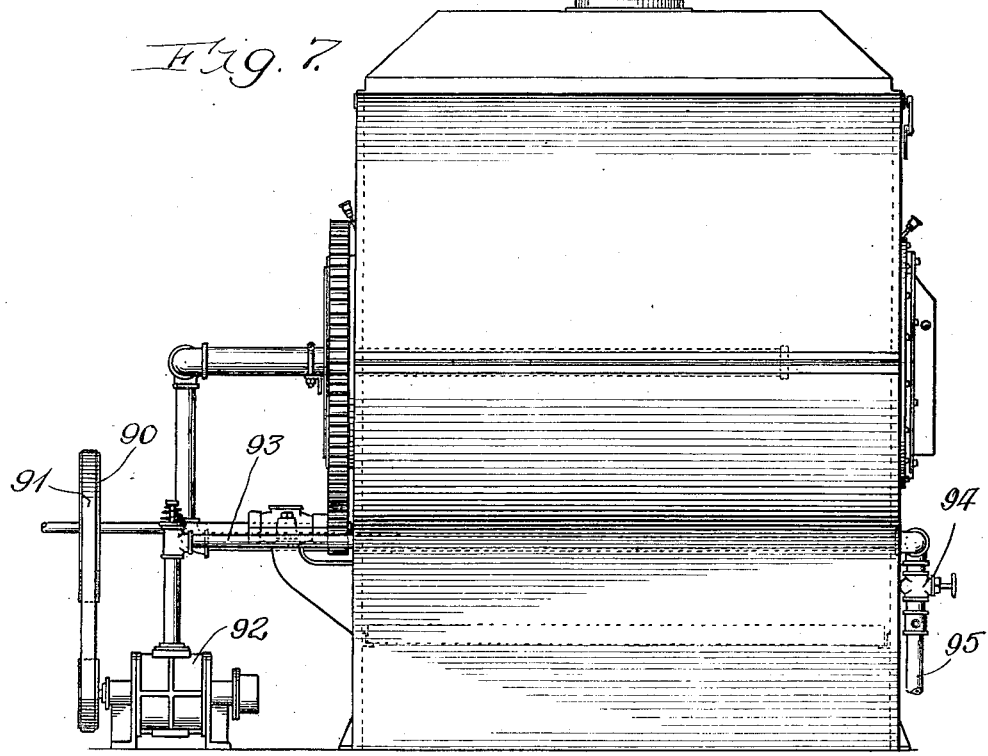
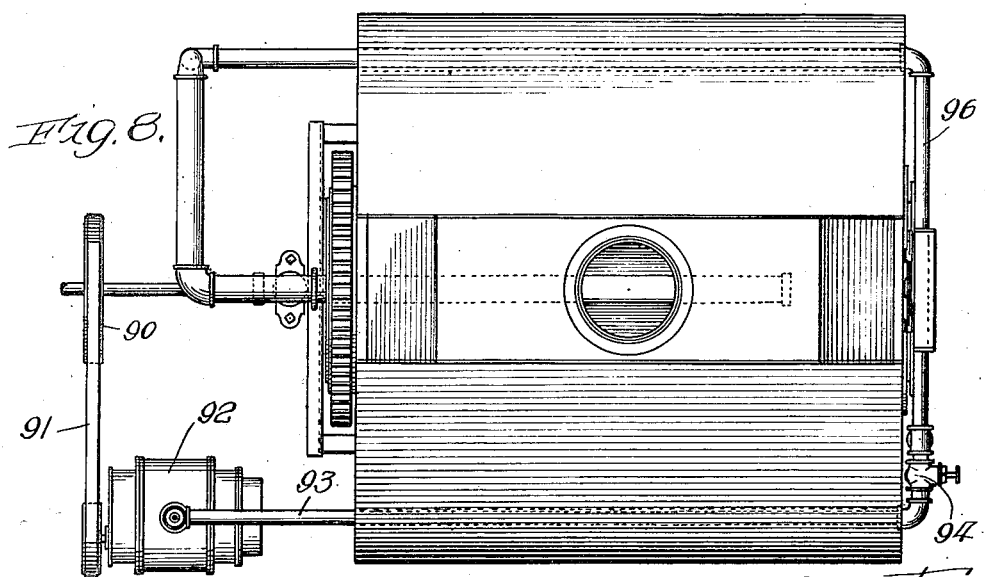

Patented Nov. 11, 1924.

1,515,385

UNITED STATES PATENT OFFICE.

ALBERT P. GROHENS, OF MARSHALL, MICHIGAN.

COFFEE ROASTER.

Application filed June 8, 1922. Serial No. 566,755.

*To all whom it may concern:*

Be it known that I, ALBERT P. GROHENS, a citizen of the United States, residing at Marshall, in the county of Calhoun and State of Michigan, have invented a new and useful Improvement in Coffee Roasters, of which the following is a specification.

This invention relates to improvements in coffee roasters and more especially to that general type of roaster comprising a rotating drum adapted to contain coffee beans for roasting and heating means. The details of construction and operation of my improved roaster, and the features and advantages thereof, will appear as I proceed with my specification.

Figure 1:
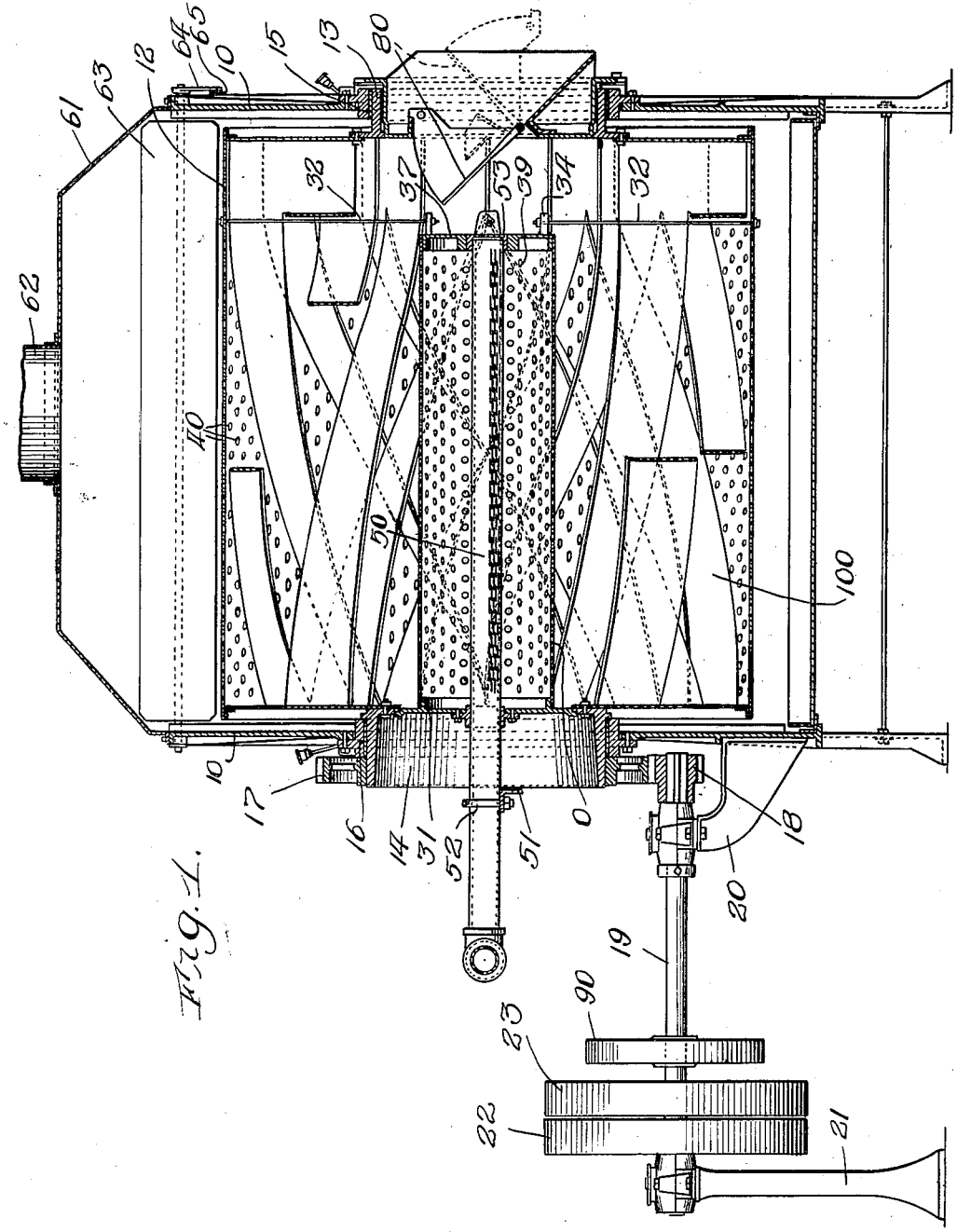
Figure 3:
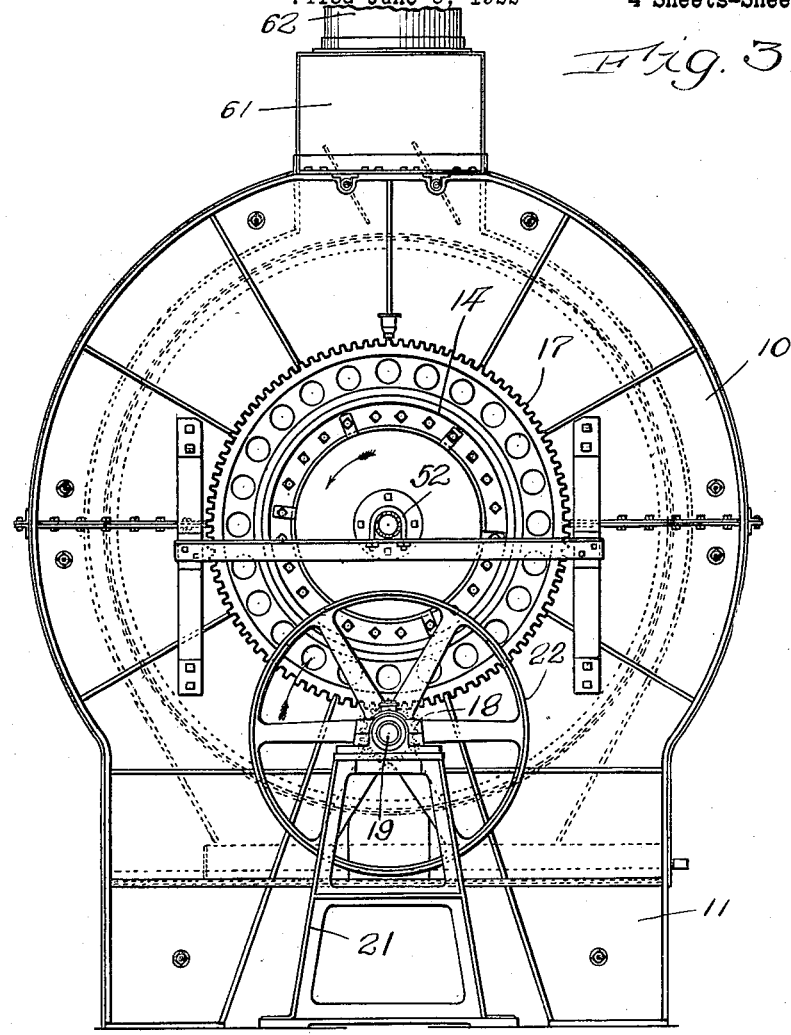
Figure 4:
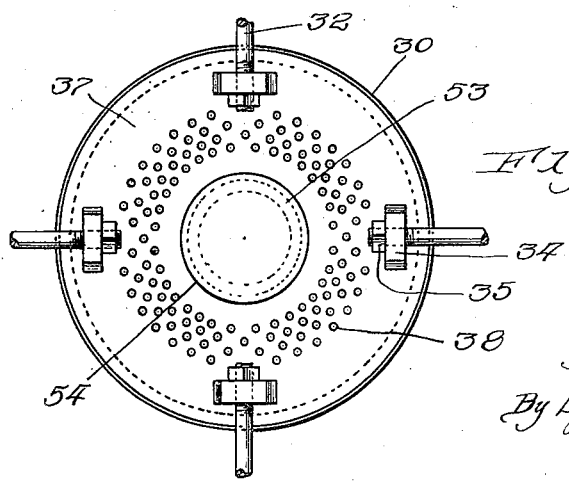

In that form of device embodying the features of my invention, shown in the accompanying drawings, Figure 1 is a vertical sectional view of the roaster, Fig. 2 is a view in elevation of the front or feed-mouth end, Fig. 3 is a rear end elevation, Fig. 4 is a view of the guard tube in end elevation on an enlarged scale, Fig. 5 is a view in side elevation of the end of the burner pipe on an enlarged scale, Fig. 6 is a view taken as indicated by the line 6 of Fig. 5, Fig. 7 is a view in side elevation on a smaller scale, showing the fuel and air piping and air compressor, and Fig. 8 is a similar view in top plan.

The roaster comprises in general a substantially cylindrical casing 10 supported on legs 11. Axially arranged and rotatably mounted within the cylindrical casing 10 is a cylindrical drum 12, the curved wall of which is made of sheet metal with one-eighth inch perforations 40, spaced apart three-sixteenths of an inch and staggered. The drum 12 carries at its forward end a trunnion 13 and at its rear end a trunnion 14. The trunnions 13 and 14 are mounted in phosphor-bronze bearings 15 and 16, respectively, carried by the end walls of the casing 10. The trunnion 14, at the rear end of the roaster, projects somewhat beyond the bearing 16 and carries a gear-wheel 17 meshing with a pinion 18 mounted on the shaft 19, which is supported at its ends in suitable bearings carried by the bracket 20 and pedestal 21. The shaft 19 also carries tight and loose pulleys 22 and 23, respectively. Any suitable means are provided for driving the shaft 19 to rotate the drum 12.

Axially arranged within the drum 12 is a smaller perforated cylinder or guard tube 30. The rear end of this cylinder or guard tube 30 is attached to the rear end wall of the drum 12 at 31. The forward end of the guard tube 30 does not extend to the forward end of the drum 12, and is supported by four radially arranged adjustable hanger rods 32. The outer ends of the hanger rods 32 are fastened to the curved wall of the drum 12, and their inner ends pass through lugs 34 (see Fig. 4) mounted on the end 37 of the guard tube 30, and carry nuts 35. By adjusting the nuts 35 on the hanger rods 32, the position of the forward end of the guard tube 30 may be very accurately and finely adjusted, so that it will lie concentrically with the drum 12. The forward end 37 of the guard tube 30 contains perforations 38, and the curved wall of the guard tube 30 is likewise perforated as indicated by 39. It is obvious that the guard tube 30 is fixed within the drum 12 and rotates with it. Axially arranged with respect to the guard tube 30 is a stationary guard pipe 50. The rear end of the burner pipe 50 is supported on an angle-iron 51 mounted on the end of the casing 10 and held in place by means of the shackle 52. The forward end of the burner pipe 50 is closed by a cap 53, which lies within a centrally arranged hole 54 in the end 37 of the guard tube 30. The hole 54 is just large enough to accommodate the cap 53 and thus support the forward end of the burner pipe 50 at the same time permitting free rotation of the guard tube 30. The burner pipe 50 has its lower half provided with slotted openings 57 arranged in rows and staggered as shown (see Figs. 5 and 6). The upper half of the burner pipe 50 is closed. This construction causes the gas flame to shoot downwardly, thus directing the first intense heat downwardly and causing a wider and more even dispersion of the flame and heat before it reaches the coffee.

The top of the casing 10 is provided with a longitudinally arranged rectangular opening 60, through which the gases and fumes escape. Over this opening 60 is arranged a hood 61, the top of which is connected to a suitable flue or vent 62. Arranged within the opening or passage 60 on top of the roaster are two vanes or gates 63 adapted to be adjusted to control the size of this opening in order to regulate the escape of gases and control the draft. The gates 63 are pivoted at their ends and are controlled by two short arms 64, the lower ends of which are joined by a connecting rod 65, which has attached to it the upwardly turned end 66 of a rod 67. The rod 67 extends through a suitable hole in a plate 68 and has its bottom edge provided with a series of notches 69 in order to hold it in various positions as desired.

The bottom of the casing 10 is open, as indicated by 70. Below this opening, slidably arranged, is a chaff pan 71.

The coffee beans are fed into the roaster and discharged from the forward end. The following feeding and discharging means are provided. The trunnion 13 is hollow thus giving a circular opening into the drum 12. Mounted within the circular opening is a pivoted chute 80 adapted to be moved from the position indicated by the solid lines in Fig. 1 to the position indicated by the broken lines. When in the position indicated by the broken lines, such chute acts as a feed chute, so that coffee beans poured into it will fall into the drum 12. When moved to the position indicated by the solid lines, it acts as a discharge chute, so that coffee beans falling into it from the drum 12 will be discharged therefrom. The chute 80 is also adapted to lie in an intermediate position, thus closing the drum 12.

In Figs 7 and 8, I have shown the piping and other means for producing the flame used in the roaster. Mounted on the shaft 19 is a belt wheel 90 driving a belt 91, which in turn drives an air compressor 92. A pipe 93 leads from the air compressor 92 to a mixing valve 94. The mixing valve 94 is also supplied with gas by the pipe 95. The mixing valve 94 serves to mix the air and acts in the right proportions to form a combustible mixture. The combustible mixture is led from the mixing valve 94 through the pipe 96 to the burner pipe 50.

The perforated guard tube 30 subdues the first intensity of the gas flame and thereby prevents scorching of the coffee beans. The perforations in this tube permit the heat and flame to pass out into the drum 12. The perforations in the end 37 of this tube 30 also permit the flame and heat from the burner tube to pass through into the drum 12. These perforations in the end plate also give a view of the flame, so that its condition can at all times be easily seen during the process of roasting.

The inside of the drum 12 is also provided with a series of radially arranged lifting blades 100, serving to agitate the coffee beans as the drum 12 is rotated, and lifting them up and dropping them on the burner tube 30.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new and desire to secure by Letters Patent, is:

1. In a device of the character described, a rotatable drum adapted to contain the material to be roasted, a perforated guard tube axially arranged within said drum, the rear end of said guard tube being attached to the rear end of the drum and the forward end of said guard tube lying a short distance behind the forward end of the drum and supported by radially arranged hanger rods, and heating means located within the guard tube.

2. In a device of the character described, a rotatable drum adapted to contain the material to be roasted, a perforated guard tube axially arranged within said drum, the rear end of said guard tube being attached to the rear end of the drum and the forward end of said guard tube lying a short distance behind the forward end of the drum and supported by radially arranged adjustable hanger rods, and heating means located within the guard tube.

3. In a device of the character described, a rotatable drum adapted to contain the material to be roasted, a perforated guard tube axially located within said drum, having its rear end attached to the rear end of said drum and its forward end lying back of the forward end of the drum and provided with lugs, hanger rods connecting the lugs on the forward end of the guard tube with the curved wall of the rotatable drum, and heating means located within the guard tube.

4. In a device of the character described, a rotatable drum adapted to contain the material to be roasted, a perforated guard tube axially located within said drum, having its rear end attached to the rear end of said drum and its forward end lying back of the forward end of the drum and provided with lugs, adjustable hanger rods connecting the lugs on the forward end of the guard tube with the curved wall of the rotatable drum, and heating means located within the guard tube.

5. In a device of the character described, a rotatable drum adapted to contain the material to be roasted, a perforated guard tube axially mounted within said drum and adapted to rotate therewith, a centrally arranged hole in the forward end of the guard tube, and a burner pipe axially arranged within the guard tube with its forward end lying in the centrally arranged hole in the forward end of the guard tube.

6. In a device of the character described, a rotatable drum adapted to contain the material to be roasted and having a feed opening in its forward end, a perforated guard tube axially arranged within the drum, and a burner pipe axially located within the guard tube, the forward end of said guard tube being provided with perforations to give a view of the burner pipe through the feed opening in the forward end of the rotatable drum.

7. In a device of the character described, a rotatable drum adapted to contain the material to be roasted, a guard tube axially arranged within said drum, the rear end of said guard tube being attached to the rear end of the drum and the forward end of said guard tube lying a short distance behind the forward end of the drum and supported by radially arranged hanger rods, and heating means located within the guard tube.

8. In a device of the character described, a rotatable drum adapted to contain the material to be roasted, a guard tube axially located within said drum, having its rear end attached to the rear end of said drum and its forward end lying back of the forward end of the drum and provided with lugs, hanger rods connecting the lugs on the forward end of the guard tube with the curved wall of the rotatable drum, and heating means located within the guard tube.

9. In a device of the character described, a rotatable drum adapted to contain the material to be roasted, a guard tube axially mounted within said drum and adapted to rotate therewith, a centrally arranged hole in the forward end of the guard tube, and a burner pipe axially arranged within the guard tube with its forward end lying in the centrally arranged hole in the forward end of the guard tube.

10. In a device of the character described, a rotatable drum adapted to contain the material to be roasted and having a feed opening in its forward end, a guard tube axially arranged within the drum, and a burner pipe axially located within the guard tube, the forward end of said guard tube being provided with perforations to give a view of the burner pipe through the feed opening in the forward end of the rotatable drum.

Witness my hand and seal this 26th day of May, 1922.

ALBERT P. GROHENS. [L. S.]